Nov. 11, 1952 W. V. HENRY 2,617,534
CANDLE FILTER ASSEMBLY
Filed Sept. 18, 1950
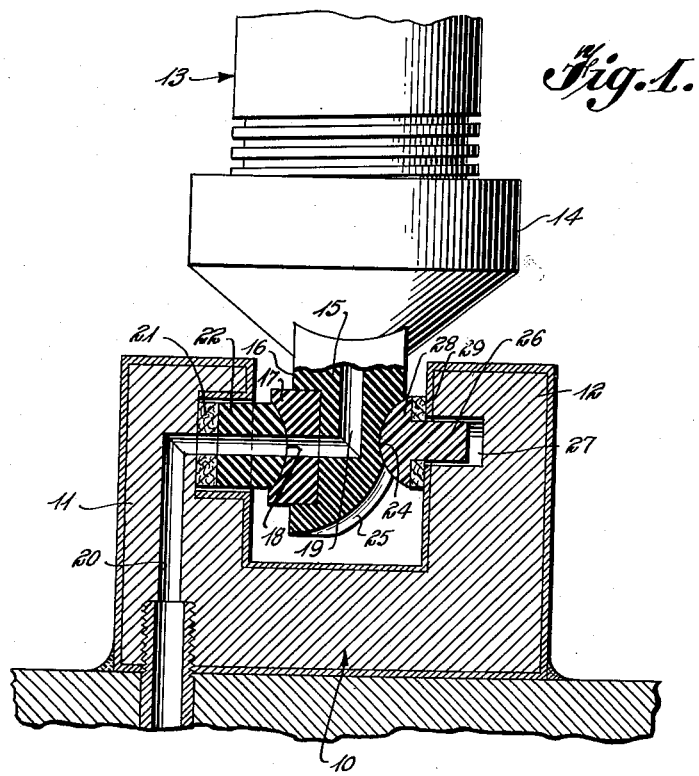
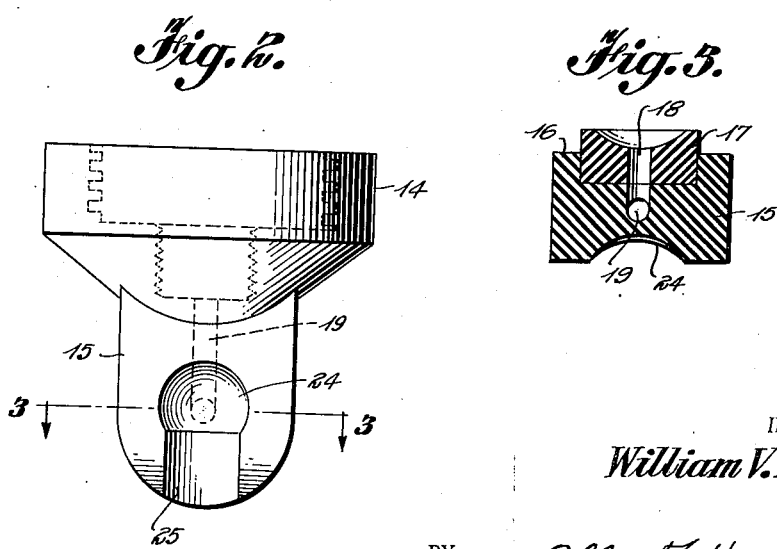
INVENTOR
William V. Henry
BY Albin F. Knight
ATTORNEY Patented Nov. 11, 1952

2,617,534

UNITED STATES PATENT OFFICE 2,617,534

CANDLE FILTER ASSEMBLY

William V. Henry, Candler, N. C., assignor to American Enka Corporation, Enka, N. C., a corporation of Delaware Application September 18, 1950, Serial No. 185,480

2 Claims. (Cl. 210—62)

The present invention relates to apparatus for use in the manufacture of filamentary materials, and more particularly to an improved connection between a candle filter and its supporting bracket.

Such candle filters have particular utility in the manufacture of rayon wherein a viscose spinning solution, for example, that has been prepared in a normal manner, is forced through a series of supply pipes to the spinning machine proper, where it is directed along a header to which are connected the lines that lead to the individual spinnerets, through which it is extruded into an aqueous acid spinbath where it is coagulated to form a thread of regenerated cellulose.

To obtain a uniform rate of flow of viscose to each spinneret, necessary for an even denier thread, a gear-wheel metering pump is employed to draw viscose from the supply header and to forward it to the spinneret at a predetermined and uniform rate of flow. The viscose is then filtered prior to its extrusion by passing it through an adjustable candle filter positioned between the metering pump and the spinneret.

Since these filters collect incompletely dissolved cellulose and foreign matter, thereby becoming clogged, it is necessary to remove and replace them at frequent intervals. Accordingly, it is desirable that this operation be made as simple as possible.

Also, in the viscose process it is essential that the spinneret can be easily moved in or out of the spinbath, but at the same time the adjustment of the spinneret within the bath must be sufficiently rigid to prevent any gradual displacement of said spinneret during spinning, which would alter the thread travel and produce undesirable differences in the properties, especially with respect to unevenness of dyeing of the thread.

There thus exists the three-fold problem of filtering the metered viscose, permitting easy and rapid replacement of the filter, and rigidly positioning the spinneret within the coagulating bath. These three functions are fulfilled by the candle filters now common in the art, which are mounted in special filter brackets on the front aprons of spinning machines, the brackets serving to supply the viscose to the filter and also to permit oscillation of the filter with respect to the bracket. The candle filter can be removed from the bracket by unscrewing a bolt threaded into the filter bracket. A glass delivery tube attached to the delivery end of the candle filter holds the spinneret assembly, so that the spinneret and candle filter are adjusted together.

At the present time the filter brackets are made in the shape of a bifurcated yoke. One arm of the yoke contains a supply line for the viscose that terminates in a port transverse to the axis of the arm and facing the other arm, while the second arm is provided with a threaded hole on the same axis as that of the port on the opposite arm. The bottom cap of the candle filter into which viscose is admitted fits between the two arms of the yoke and is maintained in position by a washer on one side and a bolt having a convex head for engaging the other side of the cap.

While this arrangement performs reasonably satisfactorily, there are several disadvantages to it which had not been overcome prior to the present invention. One disadvantage of the above described apparatus resides in the method of affixing the candle filter in the bracket. If the positioning bolt is forced too tightly against the filter candle cap, the filter cannot be adjusted with ease, whereas if the bolt is not tight enough, the filter will not remain in a fixed position. Thus, there is an optimum degree of tightening. Furthermore, as the spinneret is alternately raised and lowered into the spinbath, this repeated motion of the filter tends to cause the positioning bolt to gradually work itself loose. This effect is accentuated by the actions of the spinning operator during the threading-up of a spinning machine. The presence of air in the viscose is undesirable, for a small bubble of air passing through a spinneret orifice breaks the continuity of the particular yarn. Since bubbles have a tendency to collect on the material within the candle filter, the operator endeavors to remove them by a violent agitation and rapping of the filter before threading-up. Narrow metal shims between the filter and the positioning bolt have occasionally been utilized to reduce the effect of filter motion on the positioning bolt, but these shims are inconvenient to use and are subject to chemical corrosion and mechanical damage.

There also exists the problem of corrosion from the acid spinbath and the alkaline spinning solution. For the candle filter, a material such as hard rubber can be used advantageously, for it resists corrosion and also can be molded to the shapes required. For the filter bracket, however, this material is not strong enough to withstand the force exerted on the cap by the positioning bolt. The most satisfactory material has been cast iron covered with lead. The cast iron is inexpensive and easy to mold and drill, but on the other hand, it is readily attacked by the chemicals contained in the spinbath. Lead, which is relatively inert to the action of the spinbath, cannot be used for forming the threads because of its inherent low strength. While it would be possible to use metals such as the various stainless steels for the filter bases, these metals are both expensive and difficult to machine. Up to this time, the lead-covered cast iron base has been preferable. When these bases are installed, however, the iron threads soon begin to corrode, and replacement becomes necessary.

This replacement is a relatively expensive operation, because the entire bracket must be removed from the machine, involving disconnecting the viscose conduit from the metering pump to the supply arm of the bracket. Even before replacement is necessary, however, the iron screw threads become corroded to the extent that the positioning bolt, usually made of aluminum, cannot be readily adjusted. In this event, the candle filter again may be either too tight or too loose.

It can thus be seen that the arrangement used up to this time cannot be relied upon to give the optimum results, for the positioning bolt may be either too tight or too loose with the consequent undesirable results described above. Also, the need for replacement of the cast iron screw threads represents an unnecessarily high maintenance cost.

It is therefore an object of this invention to overcome the foregoing disadvantages and to provide an improved candle filter that is in quick detachable engagement with its bracket and can be removed readily therefrom when the spinning machine is out of operation.

It is another object of this invention to provide an improved means for maintaining a candle filter in a specified position, said means being unaffected by repeated manipulations of the candle filter about the filter bracket.

It is a further object of this invention to provide an improved and inexpensive candle filter and base assembly which can be used for longer periods of time without replacement than heretofore possible.

Other objects and advantages of this invention will become apparent from the following detailed description of a preferred form thereof, when considered in conjunction with the accompanying drawings wherein:

Figure 1 represents a side elevation, in partial section, of the device constructed in accordance with this invention shown in a typical environment;

Figure 2 is a view in elevation of the device of Figure 1 showing the surface of the lower portion of the filter which faces the supply of viscose; and Figure 3 is a view in section taken on the line 3—3 of Figure 2.

Referring to these figures, numeral 10 designates a filter base or bracket in the form of a bifurcated yoke, having two arms 11 and 12. Supported between arms 11 and 12 is a candle filter assembly generally indicated at 13. The candle filter per se is conventional and forms no part of this invention.

The lower end of candle filter assembly 13 is provided with a screw-cap 14 having an integral depending projection 15 which is rectangular in cross section adjacent the cap. The left side of this projection 15, as viewed in Figure 1 is constructed in the same manner as in the conventional candle filter, i. e., the projection is formed with a straight side 16 bearing a washer 17 having a concave face and provided with an opening or port 18 for liquid passage to conduit 19 in projection 15. In order to provide a liquid-tight passageway between conduit 19 and conduit 20 in arm 11 of base 10, a resilient packing ring 21 and a washer 22 are removably mounted around port 23 in arm 11. The face of washer 22 is convex to effect a tight fit between it and washer 17 when the projection is in operative engagement with base 10. The centers of packing ring 21 and washer 22 have openings which provide one continuous liquid-tight passageway for liquid pumped through conduit 20 and conduit 19.

As distinguished from the conventional candle filter in which the projection is symmetrical in contour design, the lower portion of the right side of projection 15, as viewed in Figure 1, is arcuate shaped from a point commencing near the bottom of depression 24. At that point a longitudinal channel guideway 25 is formed in the side.

A button-headed plug 26 is removably mounted in bore 27 formed in arm 12. This button-headed plug has a convex face 28 and is adapted to fit in, and press against, a circular concave depression 24 in projection 15. The plug is also in resilient engagement with arm 12 because of packing ring 29 which surrounds the plug adjacent the shoulder of the button head. The button-headed plug can be made of any corrosion resistant material. In practice, nylon has been found to give extremely satisfactory results, for it is readily machined, chemically resistant to the acid spinbath and alkaline spinning solution, and mechanically resistant to wear produced by oscillation of the candle filter.

It can be seen readily from the above description of the device that the candle filter can be quickly assembled in the base or bracket and can be put in operation immediately. By gripping the cylindrical portion of the candle filter and tilting it to the left between the washer 22 and the face of plug 26, the candle filter can then be easily forced downwardly until it is in operative position. The face 28 rides in guideway 25 until it locks in the depression 24, at which time the candle filter assumes a vertical position. When the candle filter is oscillated, the convex surfaces of the washer and plug head act as bearing supports for the respective concave surfaces on each side of the projection in which they ride.

The packing rings 21 and 29 are sufficiently resilient to permit assembling and disassembling, but are sufficiently rigid to urge the washer and button-headed plug into close engagement with the concave surfaces on the projection to thereby hold and retain various adjustments of the candle filter with respect to the base. Moreover, the fit is snug enough to prevent any leakage around the junctures. Obviously, to remove the candle filter it can be forced upwardly and to the left, the button-head riding out of the depression and in the guideway until the candle filter is moved out of contact therewith.

While the foregoing description has been applied to a candle filter for removing impurities from a viscose spinning solution, wherein the filter assembly supports the spinneret, it is to be understood that this device is of application whenever the three-fold problem exists of passing a liquid from a stationary element to a movable element, maintaining any given adjustment of the movable element, and facilitating rapid and easy removal and insertion of the movable element in the stationary element.

What is claimed is:

1. In a system for effecting passage of liquids, a movable element and a stationary supporting bracket therefor, said bracket having resiliently mounted means acting as the sole support for the movable element an uninterrupted conduit through the movable element and the bracket registering when the movable element is in operative engagement therewith, means on the movable element coacting with the resiliently mounted means on the bracket to hold the movable element in quick detachable engagement, said means acting to permit oscillating movement of the movable element while maintaining it in fixed axial relation to the support.

2. In a candle filter assembly including a candle filter and a stationary supporting bifurcated bracket therefor, the improvement which comprises a projection depending from the candle filter, a circular depression in each side of the projection, the lower portion of one side of the projection being arcuate-shaped from a point near the bottom of the depression, said portion being provided with a longitudinal channel guideway, a resiliently mounted bearing support in each side of the bracket for supporting the candle filter in quick detachable engagement in the depressions in the projection, said support acting to permit oscillating movement of the candle filter while maintaining it in fixed axial relation therewith.

WILLIAM V. HENRY.

REFERENCES CITED

The following references are of record in the file of this patent:

UNITED STATES PATENTS

| Number | Name | Date |
|---|---|---|
| 702,382 | Topham | June 10, 1902 |
| 1,973,971 | West | Sept. 18, 1934 |
| 2,533,799 | Haydn | Dec. 12, 1950 |